United States Patent [19]

Bessler

[11] Patent Number: 5,301,514
[45] Date of Patent: Apr. 12, 1994

[54] LOW REFRIGERANT CHARGE DETECTION BY MONITORING THERMAL EXPANSION VALVE OSCILLATION

[75] Inventor: Warren F. Bessler, Schenectady, N.Y.

[73] Assignee: General Electric Company, Schenectady, N.Y.

[21] Appl. No.: 984,647

[22] Filed: Dec. 2, 1992

[51] Int. Cl.⁵ .............................................. F25B 49/02
[52] U.S. Cl. ........................................ 62/126; 62/129
[58] Field of Search ................. 62/126, 125, 127, 129, 62/209, 212, 157, 158, 222, 223, 224, 225

[56] References Cited

U.S. PATENT DOCUMENTS

| | | | |
|---|---|---|---|
| 3,698,204 | 10/1972 | Schlotterbeck et al. | 62/206 |
| 4,167,858 | 9/1979 | Kojima et al. | 62/126 |
| 4,463,576 | 8/1984 | Burnett et al. | 62/126 |
| 4,651,535 | 3/1987 | Alsenz | 62/225 |
| 4,653,288 | 3/1987 | Sayo et al. | 62/210 |
| 4,677,830 | 7/1987 | Sumikawa et al. | 62/126 |
| 4,745,765 | 5/1988 | Pettitt | 62/129 |
| 4,745,767 | 5/1988 | Ohya et al. | 62/211 |
| 5,009,074 | 4/1991 | Goubeaux et al. | 62/129 X |
| 5,150,584 | 9/1992 | Tomasov et al. | 62/126 X |
| 5,186,014 | 2/1993 | Runk | 62/129 |

FOREIGN PATENT DOCUMENTS

| | | | |
|---|---|---|---|
| 2-110268 | 4/1990 | Japan | 62/129 |
| 2-208469 | 8/1990 | Japan | 62/129 |
| 2-217768 | 8/1990 | Japan | 62/129 |

*Primary Examiner*—Harry B. Tanner
*Attorney, Agent, or Firm*—Patrick R. Scanlon; Paul R. Webb, II

[57] ABSTRACT

Low refrigerant charge in a refrigeration system is detected by monitoring the oscillation of the thermal expansion valve. This monitoring is accomplished with a sensor which senses the oscillation of the expansion valve and produces a signal indicative of the valve oscillation. The sensor signal is fed to a monitoring controller which produces a low charge signal whenever the amplitude of valve oscillation falls below a predetermined level, thus indicating low charge conditions. The sensor is preferably a temperature sensor situated at either the outlet or the inlet of the evaporator. The system further comprises a validity evaluation controller for determining when valve oscillation is a valid indication of low charge. The validity evaluation controller analyzes a number of system operating characteristics which affect valve oscillation. If the analysis of these characteristics suggests that valve oscillation will produce a valid indication of low charge, then the validity evaluation controller will activate the monitoring controller. Otherwise, the monitoring controller will not be activated.

19 Claims, 2 Drawing Sheets

LOW REFRIGERANT CHARGE DETECTION BY MONITORING THERMAL EXPANSION VALVE OSCILLATION

CROSS REFERENCES TO RELATED APPLICATIONS

This application is related to copending applications entitled "Low Refrigerant Charge Detection Using Thermal Expansion Valve Stroke Measurement," Ser. No. 07/964,244 and "Differential Pressure Superheat Sensor for Low Refrigerant Charge Detection," Ser. No. 07/964,545, both filed Oct. 21, 1992 and assigned to the same assignee as the present invention.

BACKGROUND OF THE INVENTION

This invention relates generally to detecting low refrigerant charge in refrigeration systems under thermal expansion valve control, particularly automotive air conditioning systems, and more particularly concerns monitoring the oscillation of the thermal expansion valve to determine when a low charge condition exists. As used herein, the term "refrigeration system" refers to refrigerators, air conditioners or any other system which produces a refrigeration effect. However, the present invention is most applicable to air conditioning systems for automobiles.

In typical automotive air conditioning systems, refrigerant tends to leak through hose permeation and the rotating compressor shaft seal. Refrigerant leakage causes many problems. First, the release of refrigerants into the environment is believed to cause environmental damage. For this reason, enactment of a federal environmental protection law requiring low charge detection systems for automobiles is anticipated. Second, when the refrigerant charge becomes insufficient, the reliability and cooling performance of the system suffer. Thus, a refrigeration system with a low charge is inefficient and wasteful of energy. Furthermore, low charge causes increased compressor operating temperatures while lowering mass flow rate. Reduced mass flow rate can result in insufficient flow of lubricating oil to the compressor. The lack of oil combined with high temperatures eventually causes compressor failure. Thus, there is much interest in developing means for detecting low charges.

There are a number of known ways to detect low charge, but many of these present certain disadvantages. For instance, determining low charge by measuring refrigerant inventory will not always be accurate because the optimum inventory level varies in accordance with many variables such as compressor speed, ambient and interior temperatures, blower speed, and component volumes. Other systems employ a low pressure cut-off switch which deactivates the compressor when system pressure falls below a predetermined threshold. However, since system pressures fluctuate greatly during proper operation (25-46 psi is typical), the predetermined threshold pressure must be set very low, such as 10-20 psi. As a result, the low pressure cut-off switch is effective to indicate only a severe loss of charge resulting from a ruptured hose or complete shaft seal failure. This switch will not detect marginal low charge conditions.

One way of detecting low charge which avoids the above problems is to measure the superheat at the evaporator exit. Superheat is the amount of temperature above the saturation temperature of the refrigerant. For air conditioning systems under thermal expansion valve control, the evaporator exit exhibits a small amount of superheat (typically 0°-10° F.), but if the system charge drops below a sufficient level, excess evaporator exit superheat will develop. It is well known to use excessive evaporator exit superheat as an indication of insufficient charge. For instance, U.S. Pat. No. 4,677,830 to Seiji Sumikawa et al. discloses providing a pressure sensor and a temperature sensor near the evaporator exit. An electronic control unit converts the measured pressure to a corresponding saturation temperature of the refrigerant. The difference between the measured temperature and the corresponding saturation temperature (i.e., the superheat) is then compared to a predetermined reference value to determine whether there is a sufficient quantity of refrigerant. If an insufficient charge is detected, the compressor is rendered inoperative by a signal from the electronic control unit.

In such superheat-based low charge detectors, evaporator exit superheat cannot be measured by simply sensing evaporator exit temperature. Instead, another parameter, usually system pressure or evaporator inlet temperature, must also be sensed so that the evaporator exit superheat can be mathematically derived from the evaporator exit temperature. This requires additional sensing equipment which adds cost to the detection system. Furthermore, a high degree of evaporator exit superheat can exist even with a full charge under some conditions. For example, during startup or rapid acceleration, the expansion valve does not open fast enough to control the sudden increase in the compressor flow rate and excess evaporator exit superheat develops. Therefore, excessive superheat at the evaporator exit is not always an indication of low charge in air conditioning systems under thermal expansion valve control. Thus, direct measurement of evaporator exit superheat will sometimes produce false indications of low charge.

SUMMARY OF THE INVENTION

Accordingly, it is an object of the present invention to provide a method and apparatus which can detect marginal low charge conditions without directly measuring superheat.

More specifically, it is an object of the present invention to detect marginal low charge conditions by monitoring thermal expansion valve oscillation.

It is another object of the present invention to provide marginal low charge detection which uses pre-existing sensing equipment.

These and other objects are accomplished in the present invention which provides a refrigeration system under thermal expansion valve control with a means for monitoring the oscillation of the valve. More particularly, this includes a sensor which senses the oscillation of the expansion valve and produces a signal indicative of the valve oscillation. A means for monitoring the sensor signal is provided and produces a low charge signal whenever the amplitude of valve oscillation falls below a predetermined level, thus indicating low charge conditions. The sensor is preferably a temperature sensor situated at either the outlet or the inlet of the evaporator. The system further comprises a means for determining when valve oscillation is a valid indication of low charge. The means for determining validity analyzes a number of system operating characteristics which affect valve oscillation. If the analysis of the characteristics suggests that valve oscillation will produce a valid indication of low charge, then the means for determining validity will activate the temperature monitoring means. Otherwise, the temperature monitoring means will not be activated.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
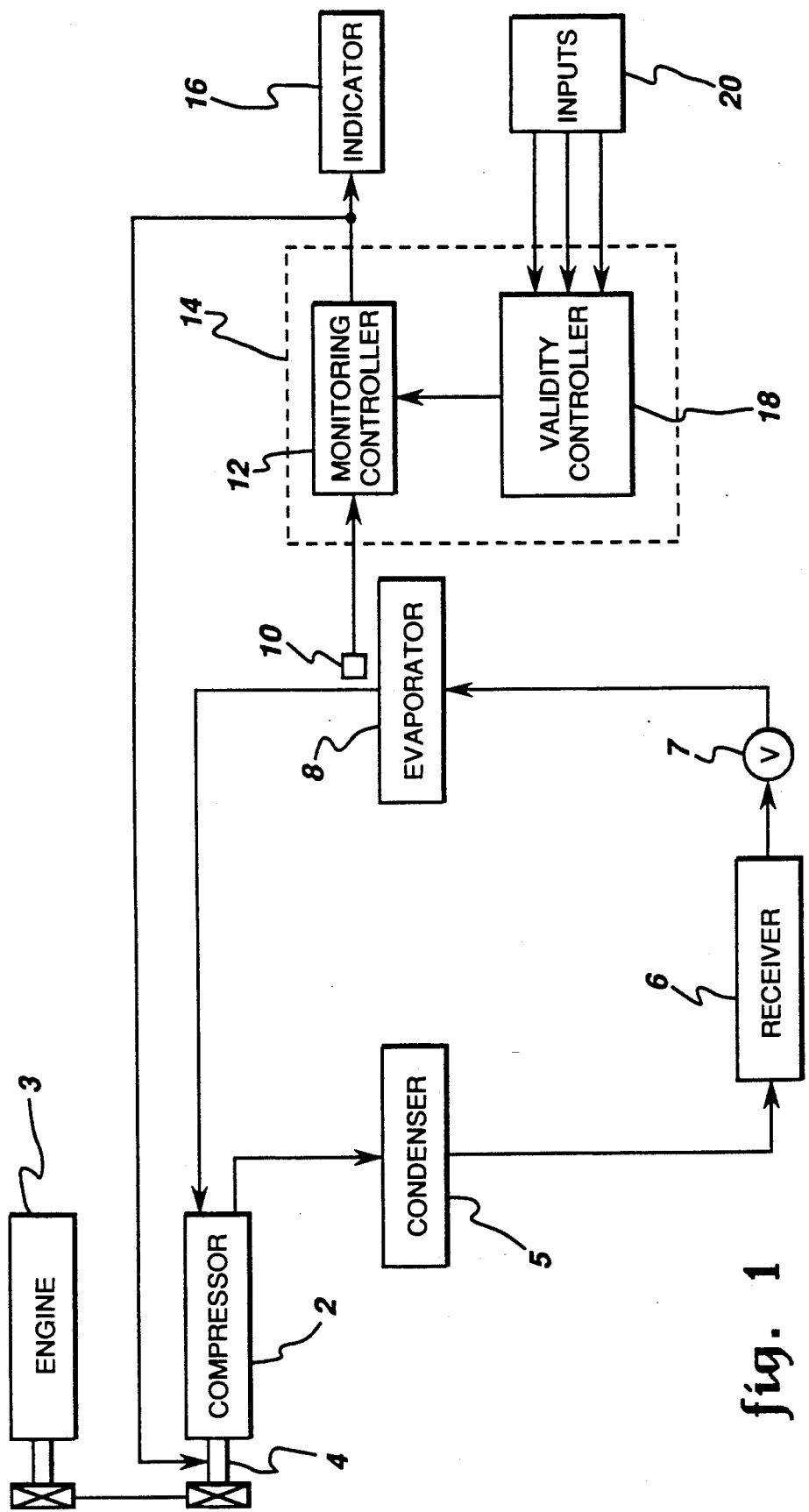
FIG. 1 is a schematic diagram of a refrigeration system showing a first embodiment of the present invention.

Referring to the drawing wherein the same reference numerals are used to identify the same elements throughout the several views, FIG. 1 shows a refrigeration system in which the low refrigerant charge detection of the present invention can be used. The refrigeration system, which will typically be an automotive air conditioning system, includes a compressor 2 which is selectively driven by an engine 3 through a clutch 4, with refrigerant being compressed by the compressor 2 to high temperature and pressure. The refrigerant is then condensed by a condenser 5 where it loses heat to the ambient. The refrigerant is then directed to a receiver 6 which passes only liquid refrigerant, thereby separating any vaporous refrigerant which may not have been fully condensed by the condenser 5. The liquid refrigerant flows through a thermal expansion valve 7 so that it undergoes adiabatic expansion. The now low pressure (i.e., saturation pressure) refrigerant flows through an evaporator 8 where it is vaporized through the absorption of heat around the evaporator 8. The gaseous refrigerant exiting the evaporator 8 is returned to the compressor 2 to repeat the cycle.

The present invention is applicable to refrigeration systems using thermal expansion valve control. In such systems, the degree of opening of the thermal expansion valve controls the amount of refrigerant flow through the evaporator and hence the level of cooling. The evaporator exit temperature is used to provide thermal control over the valve opening. This is typically accomplished by either passing the refrigerant through the expansion valve housing before it enters the compressor or by providing a thermal bulb located at the evaporator exit and fluidly connected to the expansion valve.

Due to the nature of the evaporator exit temperature thermal control, the degree of thermal expansion valve opening will oscillate between a less open position and a more opened position during normal, full charge operation. However, if refrigerant charge falls below a sufficient level, the evaporator exit superheat will rise rapidly and exceed normal levels. The thermal expansion valve will fully open in response to the excess evaporator exit superheat to permit maximum refrigerant flow through the evaporator. Thus, for low charge conditions, the thermal expansion valve will remain fully open and will not oscillate. Consequently, lack of thermal expansion valve oscillation is an indirect indication of excess evaporator exit superheat and therefore may be indicative of low charge conditions.

Accordingly, the present invention detects low charge by monitoring the oscillation of the thermal expansion valve 7. One way of monitoring valve oscillation is to monitor the evaporator exit temperature which controls the valve opening. Thermal expansion valve control typically produces evaporator exit temperature oscillations of 10°–15° F. amplitude at one to two cycles per minute. As seen in FIG. 1, a temperature sensor 10 is situated at the exit of the evaporator 8 in order to sense evaporator exit temperature and produce a corresponding temperature signal. The temperature sensor 10 is preferably a thermistor, although any device which produces an appropriate temperature signal and responds fast enough to sense the temperature oscillations could be used.

The signal from the temperature sensor 10 is fed to a temperature monitoring controller 12. The temperature monitoring controller 12 is preferably incorporated in the engine computer 14 of the automobile. The temperature monitoring controller 12 monitors the oscillations of the signal from the temperature sensor 10. As long as the signal oscillations remain above a predetermined amplitude (preferably about 5° F.), then the refrigeration system is presumed to be operating at full charge and the engine computer 14 will take no action. But if the signal oscillations fall below the predetermined amplitude for a predetermined time period (approximately 5 minutes), the temperature monitoring controller 12 will emit a low charge signal which is fed to an indicator 16. The low charge signal activates the indicator 16 (which is typically a light located on the automobile dashboard) to provide an indication of low charge. As seen in the Figure, the low charge signal can also be fed to the compressor clutch 4 to deactivate the compressor 2, thereby also shutting down the the refrigeration system in response to a low charge condition.

Even with a full charge, a thermal expansion valve can remain wide open for a significant time period under certain transient conditions. To avoid a spurious low charge signal under such transient conditions, the present invention includes a validity evaluation controller 18 which is connected to the temperature monitoring controller 12. Like the temperature monitoring controller 12, the validity evaluation controller 18 is preferably incorporated in the engine computer 14. The validity evaluation controller 18 receives input (indicated by reference numeral 20) of a number of the operating characteristics of the refrigeration system and/or the automobile where the refrigeration system is an automotive air conditioner. The validity evaluation controller 18 analyzes these operating characteristics with respect to their affect on the oscillation of the thermal expansion valve 7 and determines whether the oscillation is a meaningful indication of low charge under the current conditions. If the validity evaluation controller 18 determines that conditions are such that thermal expansion valve oscillation will provide a valid indication of low charge, then the validity evaluation controller 18 triggers the temperature monitoring controller 12 to monitor the temperature signal from the temperature sensor 10. If not, then the validity evaluation controller 18 will not activate the temperature monitoring controller 12.

Many different operating characteristics can have an affect on the thermal expansion valve opening. For automotive air conditioning systems, these include, but are not limited to, the ambient temperature, the interior temperature of the vehicle, the blower speed, the engine RPM, the vehicle speed, the coolant temperature, the compressor displacement (for systems having variable displacement compressors), and the head pressure of the air conditioning system. Most vehicles currently being manufactured have most or all of these characteristics already inputted into the onboard engine computer to control other aspects of the vehicle's performance. Thus, monitoring these characteristics for the purpose of accurate low charge detection does not require major modifications.

Each of these characteristics can have an adverse affect on the validity of a low charge signal. Regarding the ambient temperature, if it is very high, then the air conditioning system will likely be operating under a high load and the thermal expansion valve will tend to remain wide open even with a full system charge. Thus, extremely high ambient temperatures indicate low validity while moderate and low ambient temperatures indicate high validity. The vehicle interior temperature is the same; high interior temperatures indicate a likelihood of high system load and hence low validity while moderate and low interior temperatures indicate high validity. A high blower speed is also indicative of a high load on the system. Thus, a high blower speed would tend to suggest low validity while lower blower speeds suggest high validity. A high engine RPM, such as during rapid acceleration, means that a large amount of refrigerant is being pushed through the valve, causing the valve to tend to stay open. Accordingly, high engine RPM suggests low validity and low engine RPM suggests high validity. Similarly, high vehicle speed would indicate a low validity. In addition, very low vehicle speed means there is little air flow over the condenser leading to higher temperatures. Thus, very low vehicle speed also suggests low validity. However, normal vehicle speeds would indicate high validity. The coolant temperature would also suggest low validity at extreme low and high levels while moderate coolant temperatures would suggest high validity. For both the compressor displacement and the AC head pressure, high levels would indicate low validity, and low levels would indicate high validity.

In operation, the validity evaluation controller 18 is set up to assign a certain numerical weight to each of the selected operating characteristics in accordance to the considerations discussed above. Which particular operating characteristics are selected is dependent on a number of factors specific to each individual system. The characteristics are then monitored, and the corresponding numerical values are totaled and averaged to produce a single value. If this value is above a predetermined level, then the validity evaluation controller 18 activates the temperature monitoring controller 12 to monitor the temperature signal. If the calculated value is below the predetermined level, the validity evaluation controller 18 does not activate the temperature monitoring controller 12.

Figure 2:
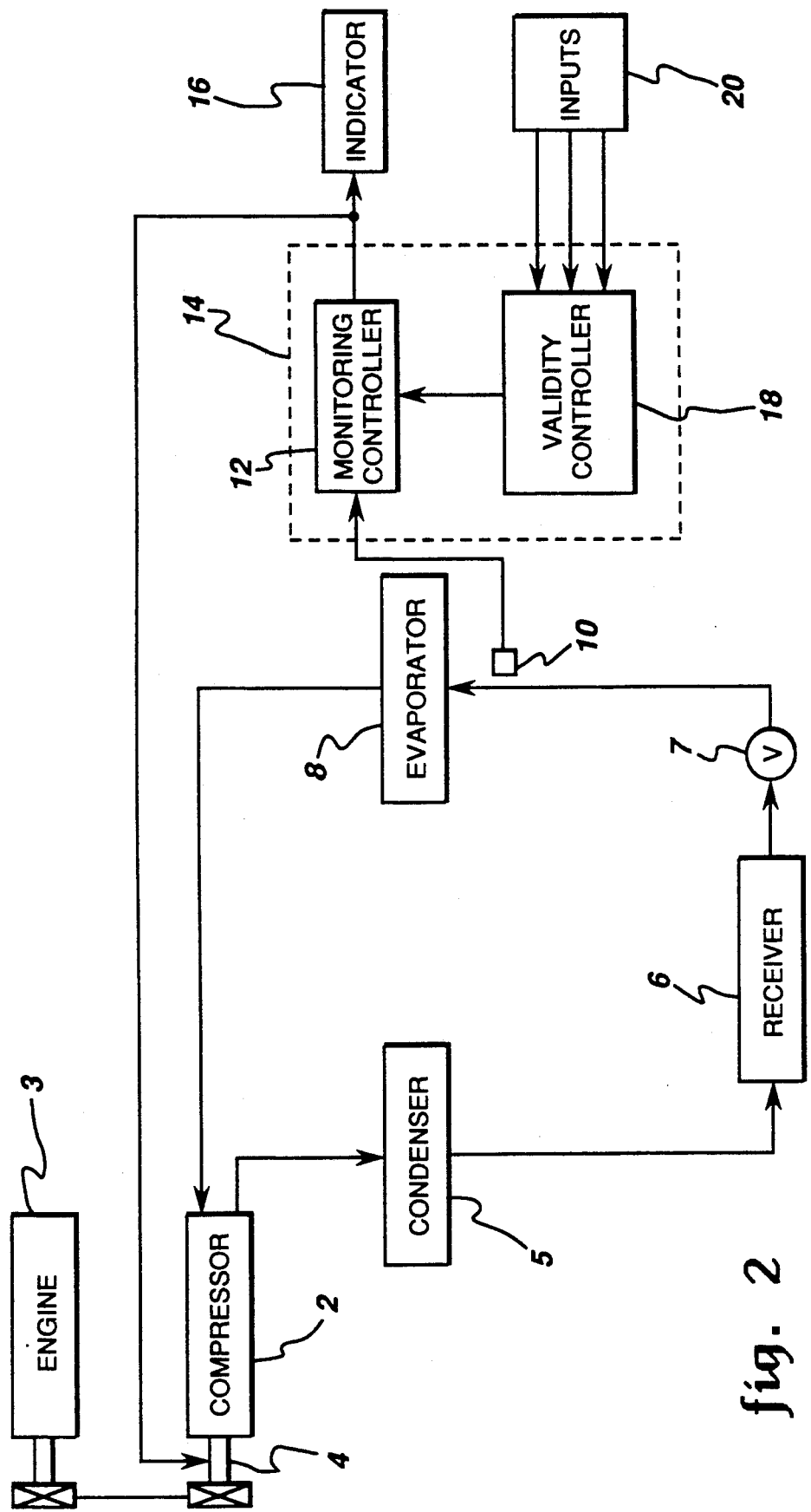
FIG. 2 is a schematic diagram of a refrigeration system showing a second embodiment of the present invention.

FIG. 2 shows a second embodiment of the present invention which monitors valve oscillation by monitoring the evaporator inlet temperature instead of evaporator exit temperature. The evaporator inlet temperature is equal to the saturation temperature of the refrigerant at the inlet pressure. As the degree of opening of the thermal expansion valve 7 oscillates, the inlet pressure, and thus the inlet temperature, oscillate accordingly. As seen in FIG. 2, the temperature sensor 10 is situated at the inlet of the evaporator 8 instead of the exit. Therefore, the signal from the temperature sensor 10 which is fed to the temperature monitoring controller 12 is indicative of the evaporator inlet temperature. Otherwise, the embodiment of FIG. 2 is the same as the embodiment of FIG. 1.

The foregoing has described the detection marginal low charge conditions by monitoring the oscillation of the thermal expansion valve. As described herein, the valve oscillation is monitored by monitoring either the evaporator exit or inlet temperature. However, the present invention can be used with any device capable of monitoring valve oscillation. These include, but are not limited to, pressure sensors, flow rate sensors located at the exit of the thermal expansion valve, or position sensors placed directly on the valve stem of the thermal expansion valve. Evaporator exit or inlet temperature sensors are preferred because many automotive air conditioning systems are currently provided with temperature sensors located at the evaporator inlet or outlet and connected to the engine computer for the purpose of controlling icing of the evaporator. Thus, low charge conditions can be detected with these sensors avoiding the need for additional sensors.

While specific embodiments of the present invention have been described, it will be apparent to those skilled in the art that various modifications thereto can be made without departing from the spirit and scope of the invention as defined in the appended claims.

What is claimed is:

1. A low refrigerant charge detecting system for a refrigeration system having an evaporator, a compressor and an expansion valve, said low refrigerant charge detecting system comprising:
    a sensor for sensing the oscillation of said expansion valve, said sensor producing a sensor signal indicative of expansion valve oscillation; and
    a first controller for monitoring said sensor signal, said first controller producing a low charge signal whenever the amplitude of said sensor signal falls below a predetermined level.

2. The low refrigerant charge detecting system of claim 1 wherein said sensor is a temperature sensor situated at the outlet of said evaporator so that said sensor signal represents the evaporator outlet temperature.

3. The low refrigerant charge detecting system of claim 2 wherein said first controller is connected to said compressor so that said low charge signal deactivates said compressor.

4. The low refrigerant charge detecting system of claim 2 further comprising an indicator connected to said first controller so that said low charge signal activates said indicator.

5. The low refrigerant charge detecting system of claim 1 wherein said sensor is a temperature sensor situated at the inlet of said evaporator so that said sensor signal represents the evaporator inlet temperature.

6. The low refrigerant charge detecting system of claim 5 wherein said first controller is connected to said compressor so that said low charge signal deactivates said compressor.

7. The low refrigerant charge detecting system of claim 5 further comprising an indicator connected to said first controller so that said low charge signal activates said indicator.

8. The low refrigerant charge detecting system of claim 1 further comprising a second controller for determining when expansion valve oscillation is a valid indication of low charge, said first controller being connected to said second controller so as to monitor expansion valve oscillation only when said second controller determines that expansion valve oscillation is a valid indication of low charge.

9. The low refrigerant charge detecting system of claim 8 wherein said second controller receives input of a plurality of operating characteristics of the refrigeration system.

10. A method for detecting low refrigerant charge in a refrigeration system having an evaporator, a compressor and an expansion valve, said method comprising the steps of:
    monitoring the oscillation of said expansion valve; and
    producing a low charge signal whenever the level of expansion valve oscillation falls below a predetermined level.

11. The method of claim 10 wherein said step of monitoring the oscillation of said expansion valve comprises monitoring the outlet temperature of said evaporator.

12. The method of claim 11 wherein said low charge signal deactivates said compressor.

13. The method of claim 11 wherein said low charge signal activates an indicator.

14. The method of claim 10 wherein said step of monitoring the oscillation of said expansion valve comprises monitoring the inlet temperature of said evaporator.

15. The method of claim 14 wherein said low charge signal deactivates said compressor.

16. The method of claim 14 wherein said low charge signal activates an indicator.

17. The method of claim 10 further comprising the step of determining when expansion valve oscillation is a valid indication of low charge, and only performing said step of monitoring the oscillation of said expansion valve when expansion valve oscillation is found to be a valid indication of low charge.

18. The method of claim 17 wherein said step of determining when expansion valve oscillation is a valid indication of low charge comprises analyzing a plurality of operating characteristics of the refrigeration system.

19. A method for detecting low refrigerant charge in a refrigeration system having an evaporator, a compressor and an expansion valve, said method comprising the steps of:
    analyzing a plurality of operating characteristics of the refrigeration system to determine whether high evaporator exit superheat is a valid indication of low charge;
    monitoring evaporator exit superheat whenever said analyzing step finds that high evaporator exit superheat is a valid indication of low charge; and
    producing a low charge signal whenever the level of evaporator exit superheat exceeds a predetermined level.

\* \* \* \* \*